April 14, 1970 J. HRDINA 3,506,366

HYDRODYNAMIC CELL

Filed June 1, 1966 3 Sheets-Sheet 1

INVENTOR.
JIŘI HRDINA
BY
Attorney

April 14, 1970  J. HRDINA  3,506,366
HYDRODYNAMIC CELL
Filed June 1, 1966  3 Sheets-Sheet 3
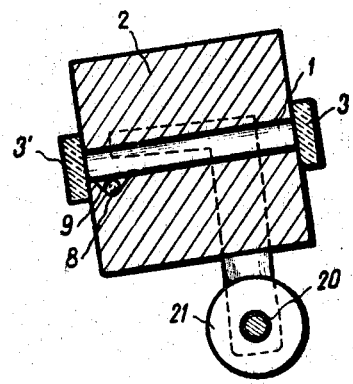
FIG. 6
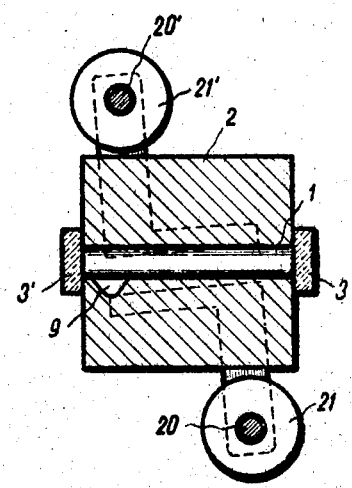
FIG. 7
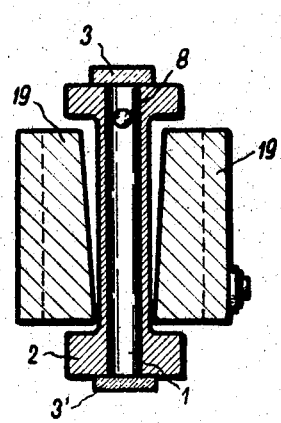
FIG. 5
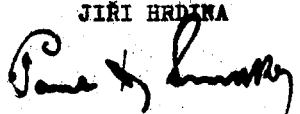
INVENTOR.
JIŘI HRDINA
BY
Attorney United States Patent Office 3,506,366
Patented Apr. 14, 1970

3,506,366
HYDRODYNAMIC CELL
Jiří Hrdina, Prague, Czechoslovakia, assignor to Ceskoslovenska akademie ved, Prague, Czechoslovakia
Filed June 1, 1966, Ser. No. 554,590
Claims priority, application Czechoslovakia, June 3, 1965, 3,596/65
Int. Cl. G01n 1/10
U.S. Cl. 356—246                    7 Claims

ABSTRACT OF THE DISCLOSURE

A photometric cell having a fluid measuring chamber with transparent end covers, a magnetizable stirrer and a shunting cavity in the lowest portion of the chamber for housing the stirrer during the measuring operation.

---

The invention relates to a hydrodynamic cell for photometry.

Due to hydrodynamic laws, more particularly in the case of a laminary flow in through-flow cells, the concentration of the material in the case of steep concentration gradients is not homogeneous over the entire flow profile of the cell. This is a very undesirable state with respect to the accuracy of photometric evaluation of the content of the cell. This effect is connected with the fact that the originally plane areas perpendicular to the flow cross-section dividing two different concentrations are transformed into paraboidal areas with a crest or top moving at double speed compared with the average flow speed of the liquid, while points at which the paraboloid reaches the tube walls remain stationary, neglecting secondary phenomena connected with diffusion and the like.

It is therefore necessary to homogenize the content of the cell if it is desired to measure photometrically a larger relative part of the entire content of the cell. This can be achieved by means of turbulence or vertical motion in the liquid caused by a tangential feed of the liquid, as already disclosed in another patent specification not yet published. It is known to homogenize the content in a transverse cell by artificial stirring or mixing with a small piston which extends from the outside into the cell, particularly if the latter opens into free space.

However, the above mentioned methods cannot be used in longitudinal cells where the flow direction agrees at least approximately with the optical axis of the photometric light beam. This is due to the fact that the piston moving in the tubular cell in the direction of its axis is an obstacle to the passage of the light beam.

It is therefore a general object of the invention to eliminate the drawbacks of the known state of art.

Another more specific object of the invention is to provide a flow-through or hydrodynamic cell for photometric purposes which is free of the mentioned drawbacks.

In accordance with the invention homogenization is achieved by means of a body, for example of spherical shape or a ball. After completed stirring up of the content of the cell in its greater part, this body is introduced into a small lateral space or chamber, for example a cavity or hole, and the functional space of the cell through which the light beam for carrying out photometry has to pass, is now free without obstacle to the passage of the light beam. The movement of the homogenization body can be achieved either by a mechanical drive from the outside, or by magnetic or electromagnetic effect through the wall of the cell. In the latter case the body is made from a ferromagnetic material so as to create therein electric or electromagnetic forces which cause the required movement of the body.

It is also possible to produce the movement of the body by gravitational or dynamic forces, not only for returning the body after forces of another type have ceased to act upon the body, but also for producing a reciprocating movement of the body. In the latter case it is of course necessary for the cell to perform movements which produce the required relative movement of the body with respect to the cell.

The above mentioned and other objects, as well as the various features and advantages of the invention will be best understood from the following specification to be read in conjunction with the accompanying drawing illustrating schematically preferred examples of embodiment of the invention.

In the drawing:

FIG. 5 is a plan view of an axial section of the embodiment of FIG. 3;

FIG. 6 is a longitudinal section of another embodiment; and

FIG. 7 is a longitudinal section of a further embodiment.

Figure 1:
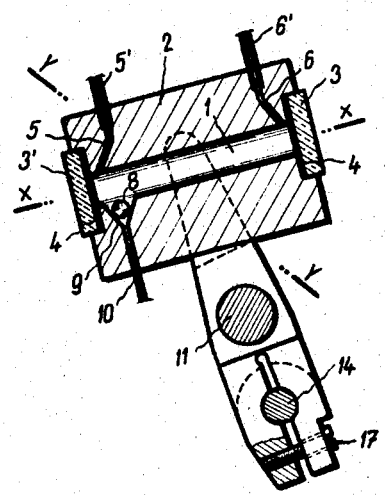
FIG. 1 is a longitudinal section illustrating schematically the hydrodynamic photometric cell in accordance with the invention with a stirring up ball moved by magnetic coupling achieved by a permanent magnet or electromagnet performing a rocking movement.
Figure 2:
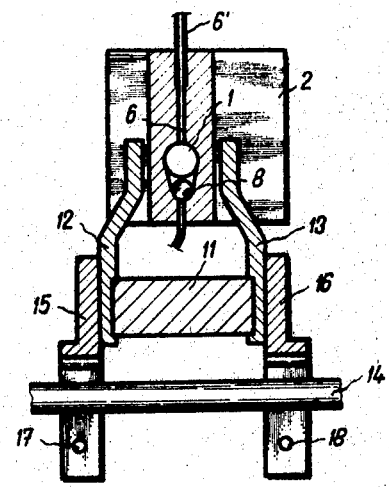
FIG. 2 shows the same embodiment as shown in FIG. 1 in a transverse section.

Referring now more particularly to FIG. 1, it can be seen that the functional space of the cell is formed by a boring 1 in the body 2 of the cell which is covered on both frontal sides with transparent inspection windows 3, 3' sealed by sealing rings 4, 4' subjected to the pressure of a non-illustrated pressure device. Near one end of the cell there opens into it an inlet duct 5 into which can be introduced a hollow needle 5' to which is joined an external capillary supply tube. On the other end of the cell there is an outlet duct 6 into which can be introduced a hollow needle 6' to which is joined an outlet tube which need not be a capillary except if there is joined thereto another hydrodynamic flow-through photometric cell, and the like. The content of the functional space 1 of the cell is homogenized by the longitudinal movement of the ball 8 which can drop into a hole or cavity 9 provided on one end (in the figure the left and of the space 1 of the cell) so that it does not interfere with the free passage of a light beam through the functional space of the cell. Into the bottom of the hole 9 there opens a hollow needle 10, which is normally blind or closed, however, it can be opened and joined to an injection needle or another similar device for drawing away impurities from the space 1 of the cell and to rinse with a suitable solution the cell and, if required, the supply tubes, too. Movement of the ball is produced by magnetic coupling with a magnetic yoke formed by a permanent magnet 11 which may be replaced by an electromagnetic core and pole shoes 12, 13 of a shape indicated for example in FIG. 2, in such a manner as to produce a magnetic flux of highest density at the place where the ball 8 lies. The mentioned yoke 11, 12, 13 is attached to a rocking shaft 14 by means of the arms 15, 16 which are preferably made from a non-magnetic material. They are attached to the shaft 14 for example by clamping together their split parts by clamping bolts 17, 18. In this manner a sufficiently firm magnetic coupling between the rocking yoke and the ball 8 is achieved. During the rocking movement of the shaft 14 and the magnetic yoke 11, 12, 13 the ball 8 moves through the space 1 of the cell. The inclined position of the cell (which has already been described in another patent application) as shown in FIG. 1 is not necessary with respect to the homogenization movement of the ball 8, but it is convenient for readily leading away bubbles from the space of the cell into the outlet duct 6 joining the space 1 in its highest place.

Figure 3:
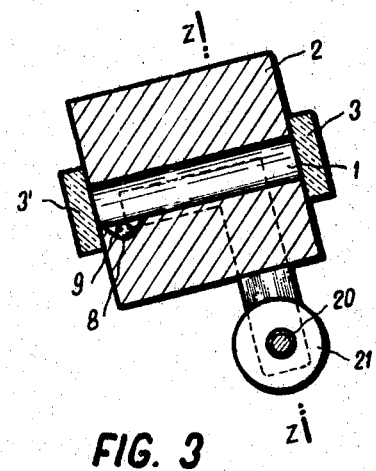
FIG. 3 shows schematically a longitudinal axis section of a cell in accordance with the invention in which the spherical body or ball is moved in an inclined upward direction by action of an electromagetic field against gravity.
Figure 4:
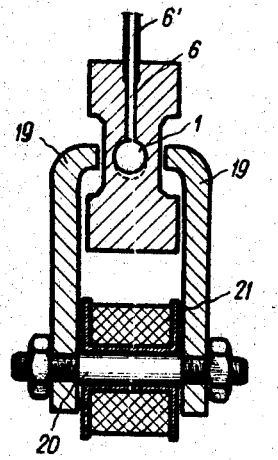
FIG. 4 is a transverse section of the embodiment in FIG. 3 along the line Z—Z.

But the inclined position of the cell 2 is a necessary operating condition in the case of the embodiment illustrated in FIGS. 3 to 5. The functional space of the cell is in this case arranged in the body 2 like in the case illustrated in FIG. 1 (but in FIG. 2 ducts are not shown). The difference in comparison with FIG. 1 resides in the fact that according to FIGS. 3 to 5 the magnetic system is stationary, and that its pole shoes 19 are arranged so that when current is switched into coil 21 wound on the core of the electromagnetic system, there is produced the desired movement against the effect of gravity on the ball 8. This subject is achieved in the embodiment illustrated in FIG. 5 by arranging the pole shoes 19 to be inclined with respect to each other so that, after switching in current, they produce a force acting on the ball 8 in the direction towards the narrowest place between the pole shoes 19.

A similar result may of course be obtained by several other embodiments of the magnetic system; for example it may be slightly deviated with respect to the channel 1 having a uniform distance between the pole shoes 19. Also in this case according to FIG. 6 one achieves that the magnetic flux through the ball 8 is increased while the latter moves to the right in an upward direction, that is against the effect of gravity. After interruption of the current, the ball 8 drops in the inclined cell 2 back to its starting position in the cavity 9, and then the photometric measurement can be carried out.

FIG. 7 illustrates an arrangement of two electromagnetic systems 20, 21, 20', 21' operating alternately. By this arrangement it is possible to achieve that even without mechanical movement of these magnetic systems the ball 8 can be forced to move to and fro suppressing the gravity effect.

It should be understood that the cell in accordance with the invention admits also of other non-illustrated embodiments. For example in the case of FIG. 1, relative movement of the ball 8 with respect to the space 1 may also be achieved without any magnetic system, for example by temporarily inclining the cell from its fundamental position X—X into a position in which the axis of the space 1 of the cell 2 occupies the position indicated in FIG. 1 by the dot-and-dash line Y—Y.

Before starting photometric measurement, the cell 2 must of course be returned into position X—X accurately and in time. No example of the many possible mechanisms to achieve this movement has been illustrated. The relative movement of the ball 8 with respect to the functional space 1 of the cell can also be achieved dynamically by moving the cell violently so that the ball lags behind the accelerated movement of the cell 2 due to its inertia, thus achieving the homogenization effect. Of course, in all cases where the cell 2 does not remain at rest, it must be attached by flexible joining tubes.

If the ball 8 is moved by magnetic forces, it is convenient to keep the paths of the lines of forces outside the yoke as small as possible. Therefore, the thickness of the body of the cell should preferably by narrowed at the places where the ball 8 lies between the pole shoes 12, 13, 19, 20, as can be seen from the exemplary embodiments illustrated in FIGS. 2 and 4.

It should of course be understood that the diameter of the ball or other body used for homogenization must be smaller than the diameter of the functional space of the cell because the ball or other body used for homogenization must not seal the cell; its movement should only stir up the liquid during the homogenization phase. There should be such a clearance between the body and the walls that the cell should not fail to function by becoming choked up or clogged by small particles penetrating thereinto.

Movement of the homogenization body can of course also be achieved by direct mechanical action.

The scope of the invention admits of many exemplary embodiments which, however, do not require a more detailed specification and illustration due to the fact that the principle underlying all these embodiment can be sufficiently clearly understood from the preceding examples which show the most preferred embodiments with the most advantageous design and operation.

I claim:

1. A photometric cell comprising in combination a cell body,
    a fluid measuring chamber longitudinally passing said body,
    a transparent cover tightly closing each end of said chamber,
    an inlet duct and an outlet duct for the fluid to be analyzed, each duct laterally entering the chamber close to one end thereof,
    a magnetizable stirrer element in said chamber sized to freely reciprocate therein,
    a shunting cavity in the substantially lowest place of the chamber to temporarily shelter the stirrer element beyond the cross area of the chamber during the measuring operation,
    a magnetic body at least on one side of the cell to reciprocate the stirrer element within the chamber by magnetizing action between measuring operations.

2. A photometric cell according to claim 1 comprising a magnetic body laterally reciprocable along the cell.

3. A photometric cell according to claim 1 comprising a permanent magnetic body.

4. A photometric cell according to claim 1 comprising a controlled electromagnetic body.

5. A photometric cell according to claim 1 wherein said magnetic body is rockable.

6. A photometric cell according to claim 1 wherein said magnetic body is a forked magnet having at least two limbs encompassing the cell body.

7. A photometric cell according to claim 6 wherein the surfaces of the limbs opposing the cell body are increasingly distanced from one end of the chamber to its other end.

References Cited

UNITED STATES PATENTS

| | | | |
|---|---|---|---|
| 1,317,886 | 10/1919 | Muchow | 259—75 XR |
| 1,456,147 | 5/1923 | Putnam | 259—75 |
| 2,405,479 | 8/1946 | Whitlock | 250—218 XR |
| 2,466,468 | 4/1949 | Neal | 259—108 |
| 2,508,950 | 5/1950 | Kaplan | 259—72 XR |
| 2,710,742 | 6/1955 | Vlock | 259—75 |
| 2,844,067 | 7/1958 | Borg | 259—75 XR |
| 2,992,077 | 7/1961 | Schneider. | |
| 3,307,447 | 3/1967 | Carleton et al. | |
| 3,345,910 | 10/1967 | Rosin et al. | |

FOREIGN PATENTS 167,274    5/1959    Sweden.

RONALD L. WIBERT, Primary Examiner

T. MAJOR, Assistant Examiner